Oct. 21, 1969        HIDEAKI NISHIMURA         3,473,587
                      MOTOR FOOD CUTTER
Filed Sept. 21, 1967                    2 Sheets-Sheet 1

INVENTOR
Hideaki Nishimura
BY
ATTORNEYS

United States Patent Office 3,473,587
Patented Oct. 21, 1969

1

3,473,587
MOTOR FOOD CUTTER
Hideaki Nishimura, Higashi-Osaka, Japan, assignor to Nantsune Tekko Kabushiki Kaisha (Nantsune Iron Works, Limited), Osaka, Japan
Filed Sept. 21, 1967, Ser. No. 669,483
Claims priority, application Japan, Feb. 27, 1967, 42/12,465
Int. Cl. A01f 29/00; A01d 55/18
U.S. Cl. 146—78                         2 Claims

ABSTRACT OF THE DISCLOSURE

This invention provides a continuous cutting means for motor food cutter for vegetables and other foodstuffs, comprising a rotatory inner cylindrical member provided inside an outer cylindrical casing and carrying a plurality of fine-cutting blades on its peripheral surface and a propeller blade on its top surface, whereby a work material fed from above is first cut into coarse pieces by said propeller blade and then cut into fine pieces of any required size, after dropped down into the opening formed between the outer cylindrical casing and inner cylinder member, by means of said fine-cutting blades.

---

The present invention relates to an improvement of motor food cutter for vegetables and other foodstuffs, and more particularly the present invention has for an object to provide improved cutting means for such cutter, which permits not only continuous feeding, cutting, and delivery of the material but also production of any desired size of cut pieces uniformly.

In a known type of food cutter comprising a plurality of rotary blade means to cut a work material into pieces, the material is dropped down from above towards the rotary blades which will cut it into small pieces while it falls through the cutter part. Such a type of food cutter, however, always suffers from the defect that the work material dropped into the cutter does not always touch the blades regularly, thus making it impossible to produce cut pieces of regular and uniform size.

Still in another known type of food cutter having a construction whereby its blade means rotate inside a casing packed with a fixed quantity of foodstuff, continuous minute cutting is very difficult and furthermore, cutting of a small quantity of the material is almost impossible.

This invention therefore provides an improved cutting means for such drop-cutting type of motor food cutter, in order to overcome the abovementioned defect.

The nature and advantage of this invention will be more clearly understood by reference to the following descriptions made in connection with the accompanying drawings, in which.

Figure 1:
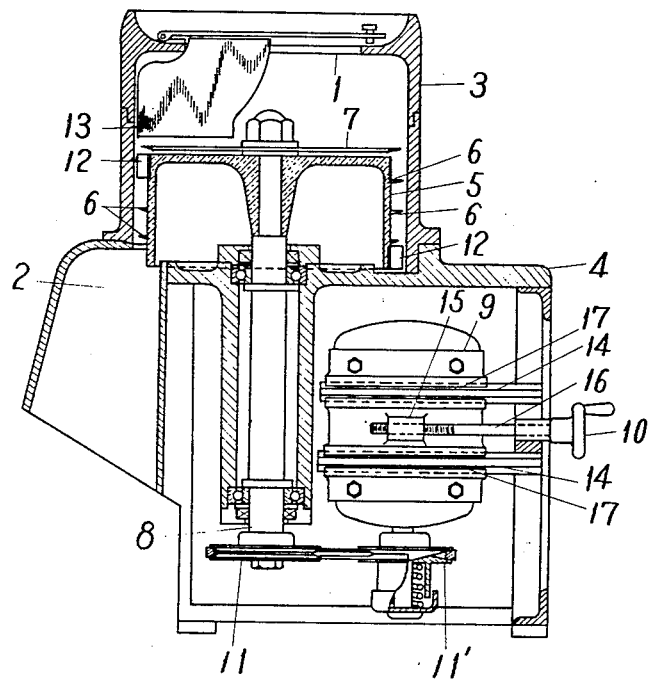
FIG. 1 is a side elevation in vertical section of a motor food cutter according to the present invention.
Figure 2:
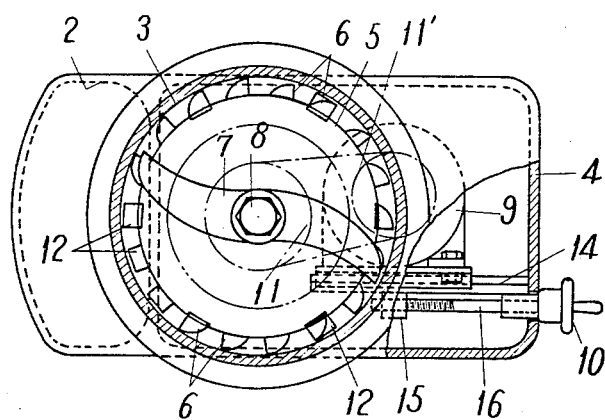
FIG. 2 is a plan view, partly in section, of the food cutter shown in FIG. 1.
Figure 3:
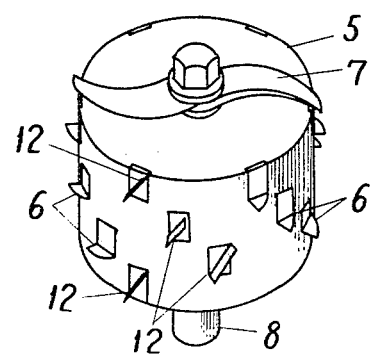
FIG. 3 is a perspective view of a rotary cutting means constituting the principal element of the present invention.
Figure 4:
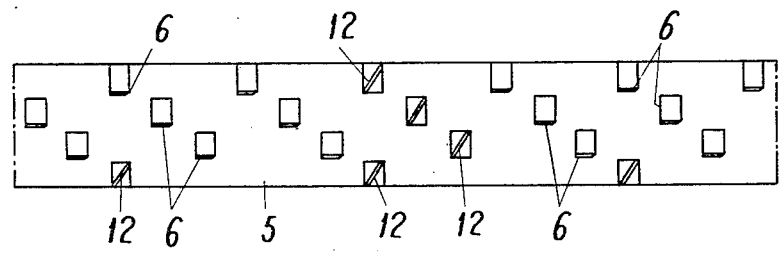
FIG. 4 is an exploded view of the rotary cutting means, showing the relative arrangement of its blades and scraper members.

Now, referring to the drawings, an outer cylindrical casing 3 having an intake part 1 on its upper portion and an outlet 2 at one corner of its bottom portion is rigidly mounted on the machine frame 4. Provided rotatably inside said cylindrical casing 3 is another cylindrical member 5 of smaller diameter, which is so arranged as to revolve with a small space kept between it and the inner peripheral wall of the outer cylindrical casing 3. Said inner cylindrical member 5 carries on the whole surface of its periphery a desired number of blade means 6 arranged at regular intervals in several steps. On the top surface of said rotatory cylindrical member 5 is provided a propeller blade means 7 so designed as to revolve together with the former for rough-cutting of the material.

According to a modified embodiment of the present invention, the aforemention type of motor food cutter is provided with a speed variator means which is connected to the rotatory shaft 8 of said inner cylindrical member 5, in order to adjust the fineness of fine-cut pieces, as desired, by varying the revolving speed of said cylindrical member 5.

Referring to the above modified embodiment of the present invention, an outer cylindrical casing 3 having an intake 1 for work material at its upper portion and an outlet 2 at the corner of its bottom portion, is rigidly mounted on the machine frame 4 and an inner cylinder member 5 is provided inside said outer cylindrical casing 3 in such a way as to revolve on its shaft 8 with a uniform little space between it and the inner wall of said outer cylindrical member 3. On the peripheral surface of this inner cylinder 5, a plurality of fine-cutting blades 6 and scraper members 12 are mixedly provided at regular intervals in several steps. 7 is a propeller-shaped blade for rough-cutting purpose, which is provided securely at the center of top surface of the inner cylinder 5 so that it may revolve in a unit with the latter, as the latter's shaft 8 is driven by a motor 9 through transmission pulleys 11, 11'. The pulleys 11, 11' function as a speed variable means so designed as to change the revolving speed of said shaft 8 faster or slower by adjusting the distance between the motor 9 and the shaft 8. Provided on the external side of the motor 9 is a female-screwed projection 15, in which a transverse male-screwed shaft 16 is engaged, and the head portion of the shaft 16 is led out of the machine through the machine frame 4 and carries at its external end a handle 10 which is manipulated to move the motor 9 sideways either toward or away from the shaft 8 of the inner cylinder 5. 13 is a control plate for the intake of work material for rough-cutting and 14 is an inwardly-protruding railed bar secured on the machine frame 4, which engages a longitudinal groove 17 provided on the fitting base of the motor 9. By means of this engagement, the rail member 14 supports the motor 9 upward in a fixed position and simultaneously operates as a guide rail for transverse movement of the motor.

Now, referring to the method of use of the food cutter in accordance with the present invention, the work material is continually fed in at a suitable speed from the material intake 1, and the material is first cut roughly by the rough-cutting propeller blade 7, whereupon the rough cut pieces are blown off by centrifugal force in the peripheral direction on the top surface of the rotary inner cylinder 5 and pushed away into the space formed between the outer cylindrical casing 3 and the tatory inner cylinder 5 and pushed away into the space 12 arranged in several steps on the peripheral surface of the rotatory inner cylinder 5 and then are guided downward step by step along the inclined surfaces of these scrapers, in the course of which the rough-cut pieces are minutely cut by the protruding fine-cutting blades 6 provided at regular intervals in several steps on the peripheral surface of said cylinder 5, and finally they fall out of the machine through the outlet 2.

If the inner cylinder 5, which is a fine-cutting device, is rotated at a faster speed, the work material is cut into fine pieces and if rotated at a slower speed, the material is cut into coarse pieces. In order to obtain various sizes of cut pieces, therefore, the machine is so constructed that, by turning the male screwed shaft 16 by the manipulation of the handle 10, the motor 9 is brought close to or away from the shaft 8, with the result that the revolving speed of said inner cylinder 5 is varied so as to permit cutting of the material into any required fineness (or roughness). The speed variable pulley 11' in this case consists of the back-to-back arrangement of two disc plates by pressing them tightly together by means of a spring member so as to form a V-shaped groove between the two plates to receive V-belt therein. Hence, when the motor 9 is moved away from the shaft 8, the V-belt wedges deeply into the opening formed between the two disc plates, lessening the diameter of a circular contact area of disc plates and the V-belt, with the result that the ratio of transmission of rotating motion to the pulley 11 is lowered, thus making it possible to adjust the revolutions of the shaft 8 and the cylinder 5.

As abovementioned, the present invention is a high-level invention which permits not only continuous minute cutting of vegetables and other foodstuffs irrespective of the volume but also production of cut pieces of any desired size evenly without the fear of deteriorating the quality of the material.

Having thus described the nature of the present invention, what I claim herein is:

1. A motor food cutter comprising an outer cylindrical casing rigidly mounted on the machine frame, a rotatory inner cylindrical member provided inside said outer cylindrical casing in such a manner as to revolve with small and uniform spacing from the inner periphery of said outer casing and carrying on its peripheral surface a plurality of blade members and scraper members mixedly arranged at regular intervals in several steps and a propeller-shaped cutter member for rough-cutting, provided on the top surface of the rotatory inner cylindrical member in such a manner as to rotate in a unit with said rotatory inner cylindrical member.

2. A motor food cutter comprising an outer cylindrical casing rigidly mounted on the machine frame, a rotatory inner cylindrical member provided inside said outer cylindrical casing in such a manner as to revolve with small and uniform spacing from the inner periphery of said outer casing and carrying on its peripheral surface a plurality of blade members and scraper members mixedly arranged at regular intervals in several steps, a propeller-shaped cutter member for rough-cutting, provided on the top surface of the said inner cylindrical member in such a manner as to rotate in a unit with said inner cylindrical member, and a speed variator means connected to the rotatory shaft of said rotatory inner cylinder member.

References Cited

UNITED STATES PATENTS 2,421,014  5/1947  Coss et al. _____ 146—124 X
3,203,457  8/1965  Minet _____ 146—3

W. GRAYDON ABERCROMBIE, Primary Examiner

U.S. Cl. X.R.
146—79, 124